United States Patent
Simeonov et al.

(10) Patent No.: US 11,086,616 B2
(45) Date of Patent: Aug. 10, 2021

(54) NEAR ZERO DOWNTIME APPLICATION UPGRADE

(71) Applicant: VMware, Inc., Palo Alto, CA (US)

(72) Inventors: Tomo Vladimirov Simeonov, Sofia (BG); Ivaylo Radoslavov Radev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/141,091

(22) Filed: Sep. 25, 2018

(65) Prior Publication Data

US 2020/0097280 A1 Mar. 26, 2020

(51) Int. Cl.
*G06F 9/44* (2018.01)
*G06F 8/656* (2018.01)
*G06F 9/455* (2018.01)
*H04L 29/06* (2006.01)

(52) U.S. Cl.
CPC .......... *G06F 8/656* (2018.02); *G06F 9/45558* (2013.01); *H04L 63/0272* (2013.01); *G06F 2009/45575* (2013.01); *G06F 2009/45595* (2013.01)

(58) Field of Classification Search
CPC ....................................................... G06F 8/656
USPC ....................................................... 717/168
See application file for complete search history.

(56) References Cited

U.S. PATENT DOCUMENTS

| | | | |
|---|---|---|---|
| 6,018,747 A | 1/2000 | Burns et al. | |
| 7,093,086 B1 * | 8/2006 | van Rietschote | G06F 11/1438 |
| | | | 711/161 |
| 7,360,208 B2 | 4/2008 | Joshi et al. | |
| 7,752,616 B2 | 7/2010 | Marolia et al. | |
| 8,438,558 B1 | 5/2013 | Adams | |
| 9,063,756 B2 * | 6/2015 | Ben-Shaul | G06F 3/0484 |
| 9,477,491 B2 * | 10/2016 | Ben-Shaul | G06F 9/4451 |
| 9,645,899 B1 * | 5/2017 | Felstaine | G06F 11/2025 |
| 9,960,963 B2 | 5/2018 | Selvaraj et al. | |
| 9,996,374 B2 * | 6/2018 | Sieffert | G06F 9/45545 |
| 10,140,115 B2 * | 11/2018 | Fukui | G06F 8/65 |
| 10,157,077 B2 * | 12/2018 | Voccio | G06F 9/461 |
| 10,360,056 B2 * | 7/2019 | Costea | |
| 2003/0149970 A1 | 8/2003 | Shanbhogue et al. | |
| 2009/0276771 A1 * | 11/2009 | Nickolov | G06F 9/4856 |
| | | | 717/177 |
| 2009/0300605 A1 * | 12/2009 | Edwards | G06F 9/5077 |
| | | | 718/1 |
| 2016/0210209 A1 * | 7/2016 | Verkaik | G06F 11/2033 |

(Continued)

*Primary Examiner* — Evral E Bodden

(57) ABSTRACT

A system for upgrading an application running on a virtual computing instance (VCI) can include a processing resource, a memory resource, and a VCI manager. The VCI manager can be executed by the processing resource and the memory resource and can be configured to cause a first VCI that is running the application to be copied as a second VCI, cause an updated version of the application to be installed on the second VCI, and cause a private network to be generated between the first VCI and the second VCI. The VCI manager can be further configured to cause data to be synchronized between the first VCI to the second VCI via the private network and cause the application running on the first VCI to be deactivated and cause the updated version of the application to be activated on the second VCI.

17 Claims, 4 Drawing Sheets

(56) References Cited

U.S. PATENT DOCUMENTS

2018/0011874 A1* 1/2018 Lacapra .............. H04L 67/1097
2019/0095253 A1* 3/2019 Curtis ................. H04L 41/5054

* cited by examiner

NEAR ZERO DOWNTIME APPLICATION UPGRADE

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
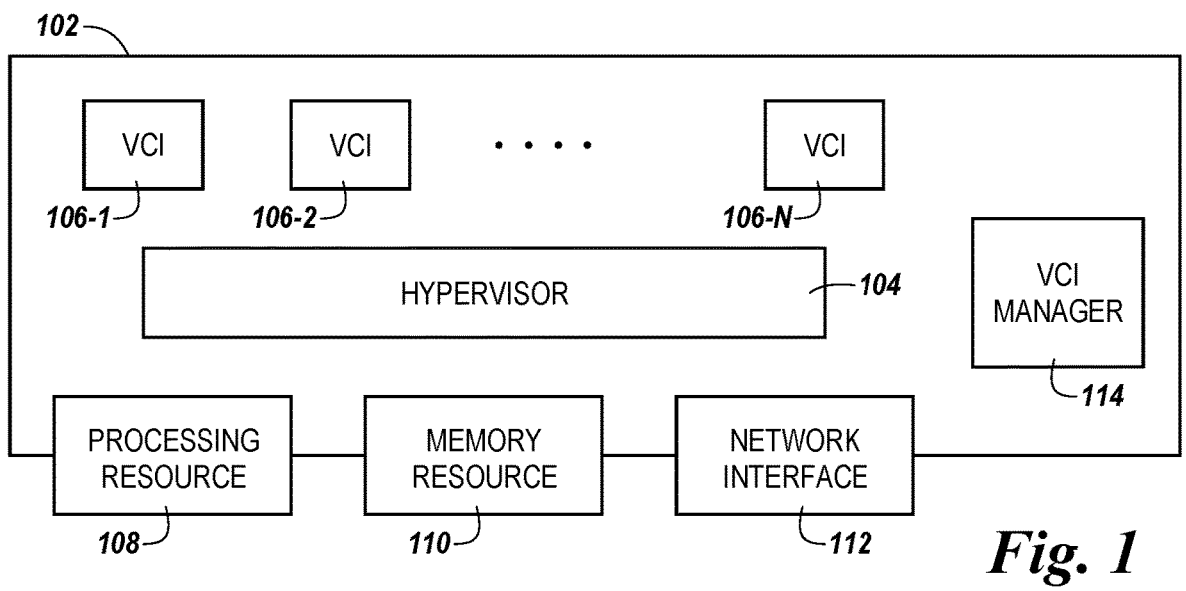
FIG. 1 is a diagram of a host for near zero downtime application upgrades according to the present disclosure.

The term "virtual computing instance" (VCI) covers a range of computing functionality. VCIs may include data compute nodes such as virtual machines (VMs) and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more "lightweight" than VMs at least because they share an operating system rather than operating with their own guest operating system.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

In a software defined data center, it may be beneficial to upgrade (e.g., update, improve, re-configure, alter, etc.) applications that operate on VCIs in the software defined data center. However, updating applications can, in some approaches, incur VCI downtime, which can negatively impact a user of resources of the software defined data center. As used herein, an "application" refers to a set of instructions executable by a processing resource, which may also be referred to as a program or group of programs, to perform a task via a computing system. The task, for example, can be designed to benefit a user of the computing system. As people become more and more connected to the internet and, in turn, to computing resources of software defined data centers, expectations of 24/7 connectivity can increase. This can put pressure on applications deployed on the VCIs of a software defined data center due, in part, to the increasing expectations of 24/7 availability of such applications. These expectations can mean that tolerance of application downtime is reduced, which can put further pressure on applications deployed in the software defined data center to be available constantly (or near constantly).

Due to the dynamic nature of applications deployed in a software defined data center (e.g., applications running on VCIs, computers, etc. of the software defined data center), such applications inevitably require upgrades at some point in time. As describe above, downtime due to application upgrades in a software defined data center can run counter to the increasing expectations of users of those applications that the application will be constantly available. This can be further exacerbated in scenarios in which the application(s) that are to be upgraded do not have architecture support for such upgrades and/or require specific types of deployments to be upgraded.

In some approaches, applications can incur downtime as a result of being upgraded (e.g., improved, altered, updated, etc.). An application upgrade can include the introduction of a replacement set of executable instructions comprising the application into an environment in which the instructions are executed. For example, the replacement instructions can be stored in a non-transitory machine readable medium from which the replacement instructions can be executed by a processing resource. As described in more detail herein, additional steps beyond the introduction of the replacement instructions may be necessary in order for the upgrade to be functionally complete. In some approaches, when an application is upgraded, a user can experience downtime to the application while the upgrade is performed. For example, the execution of instructions comprising the application may have to be partially or completely halted while the upgrade is performed, which can interrupt performance of the task by the application. Further, in some approaches, application upgrades that try to reduce downtime can require significant architecture support to perform application upgrades.

Examples of approaches to application upgrades can include rolling upgrades, blue-green deployments, in-place upgrades, and read mode upgrades (e.g., upgrade methodologies in which an old system operates in read mode while the application is upgraded), among others. In rolling upgrade approaches, however, a significant amount of architecture support can be employed to provide upgrades with low downtimes. For example, architecture support to allow the coexistence of both a new version of the application and the old version of the upgrade may be provided to allow for rolling upgrades, which can make use of rolling upgrade approaches costly and/or inefficient.

Blue-green deployments can suffer from shortcomings inasmuch as blue-green deployments can be inefficient and can require additional resources to run two separate copies of the application while both the blue deployment and the green deployment are running. Further, blue-green deployments can provide lackluster handling of database changes, and can only work for certain types of applications, thereby further limiting their usefulness.

In order to alleviate the deficiencies of some approaches to application upgrades, embodiments described herein can provide for applications to be upgraded (e.g., improved, altered, updated, etc.) with "near zero" (e.g., zero, very little, etc.) downtime to the application. For example, in some embodiments, an application running on a source VCI may be upgraded with near zero downtime by deploying a target VCI and synchronizing data between the source VCI and the target VCI. The target VCI can be a copy of the target VCI (e.g., by synchronizing data between the source VCI and the target VCI). Once the data between the target VCI and the source VCI is synchronized, the application can be upgraded on the target VCI while the source VCI is still running. At some point after the application is upgraded on the target VCI, the target VCI can be activated such that a user is switched from using the source VCI to the target VCI. In some embodiments, this can allow for it appear to the user that the application was upgraded with "near zero" downtime.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to a near zero downtime application upgrade, for example, in the context of a software defined data center (e.g., a distributed computing environment) including one or more VCIs. As used herein, "near zero downtime" refers to downtime that is either zero or close-enough to zero that it may be difficult or impossible for a user to tell that the downtime isn't exactly zero. For example, a downtime on the order of milliseconds can be considered to be "near zero."

In some embodiments, a VCI manager can run using resources that are ultimately executed by a processing resource and a memory resource. The VCI manager can cause a first VCI that is running an application to be copied as a second VCI. In some embodiments, the second VCI can be copied such that it includes same network information and/or a same storage layout as the first VCI. The VCI manager can cause an updated version of the application to be installed on the second VCI. A private network, such, but not limited to, a virtual private network (VPN) can be generated between the first VCI and the second VCI. The VCI manager can cause data to be synchronized between the first VCI and the second VCI via the VPN. In some embodiments, the VCI manager can cause the application running on the first VCI to be deactivated and/or cause the updated version of the application to be activated on the second VCI.

FIG. 1 is a diagram of a host 102 for near zero downtime application upgrades according to the present disclosure. The system can include a host 102 with processing resource (s) 108 (e.g., one or more processors), memory resource(s) 110 (e.g., one or more main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs 106 can be local and/or remote to the host 102 (e.g., the VCIs 106 can be ultimately executed by hardware that may not be physically tied to the VCIs 106). For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, a VCI among the number of VCIs can be a master VCI. For example, VCI 106-1 can be a master VCI, and VCIs 106-2, ..., 106-N can be slave VCIs. The host 102 can be connected to (e.g., in communication with) a VCI manager 114.

Figure 4:
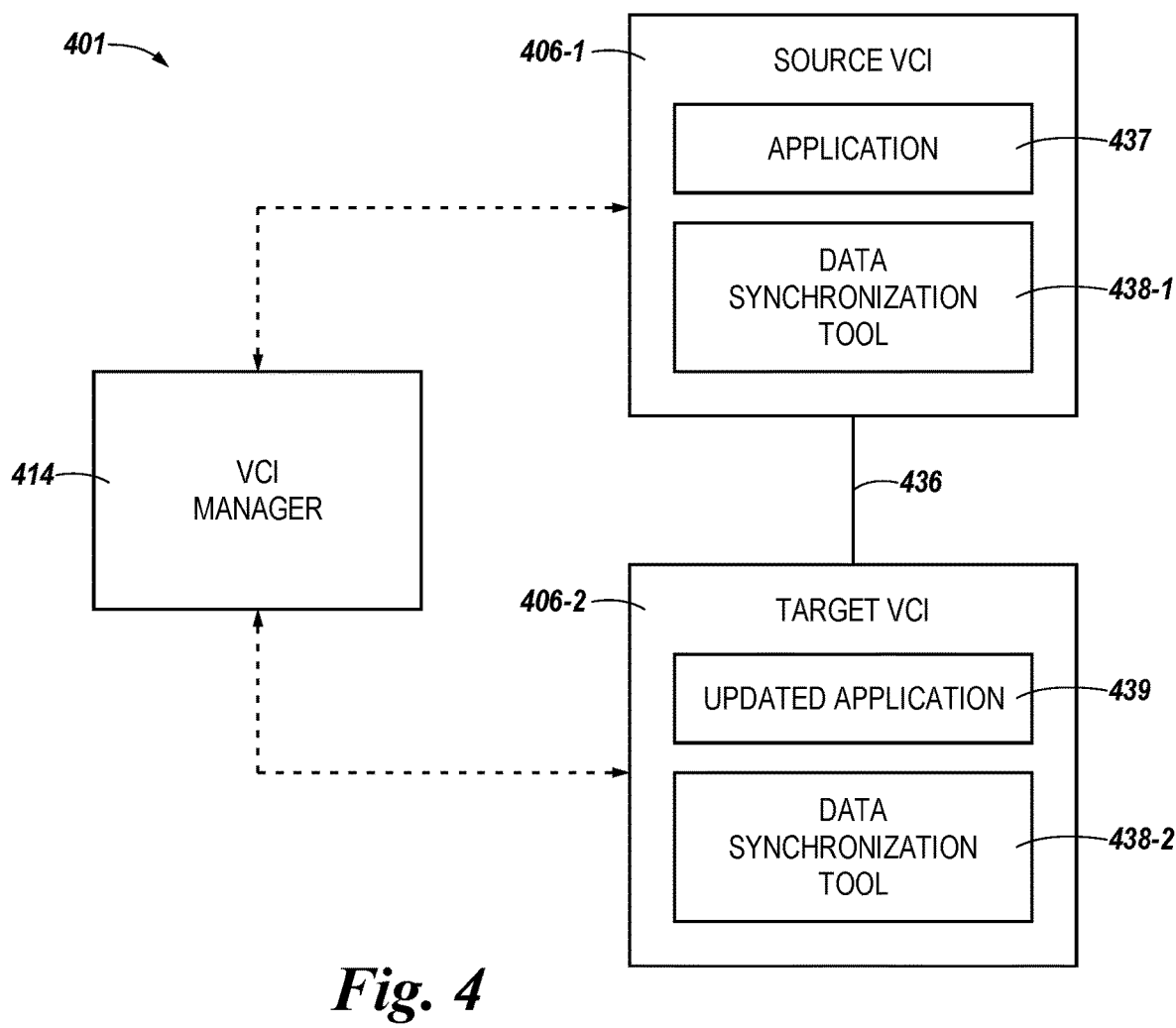
FIG. 4 is diagram of a system including a target virtual computing instance (VCI) and a source VCI for near zero downtime application upgrades according to the present disclosure.

The VCIs 106-1, ..., 106-N can having one or more applications running thereon. For example, as shown in FIG. 4, a first VCI 106-1 can have an application (e.g., the application 437 illustrated in FIG. 4, herein) running thereon. The application may be configured to perform certain tasks and/or functions for the first VCI 106-1. As described in more detail herein, it may become desirable or necessary to upgrade the application that is running on the first VCI. In contrast to some approaches in which the application incurs downtime during the upgrade process, however, embodiments herein can allow for the first VCI to be copied as a second VCI 106-2 that has an upgraded version (e.g., the updated application 439 illustrated in FIG. 4, herein) of the application installed or deployed thereon.

In some embodiments, the VCI manager 114 can be configured to cause performance of near zero downtime application upgrades, as described in more detail, herein. In some embodiments, the VCI manager 114 can be deployed on (e.g., may be running on) the host 102, and/or one or more of the VCIs 106. In some embodiments, the VCI manager 114 can be deployed on the host 102 or a VCI (e.g., VCI 106-1), which may be the only host 102 or VCI (e.g., VCI 106-1) that is running or is provisioned with a pool of computing resources.

In some embodiments, the VCI manager 114 can include a combination of software and hardware, or the VCI manager 114 can include software and can be provisioned by processing resource 108. An example of the VCI manager 114 is illustrated and described in more detail with respect to FIGS. 2 and 4, herein.

Figure 2:
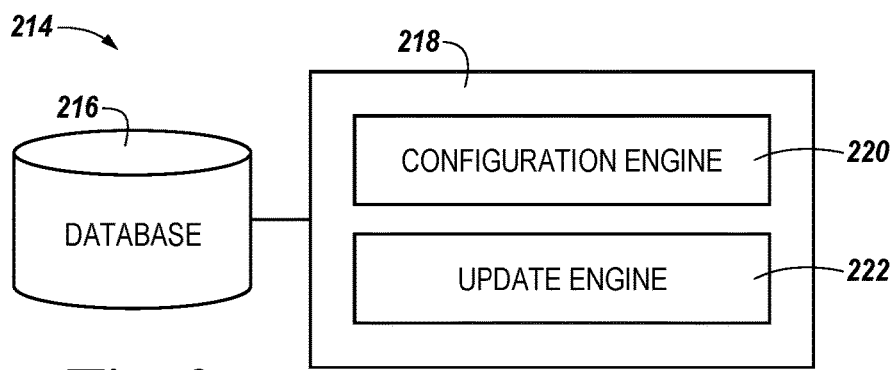
FIG. 2 is a diagram of a system for near zero downtime application upgrades according to the present disclosure.

FIG. 2 is a diagram of an apparatus for near zero downtime application upgrades according to the present disclosure. The apparatus 214 can include a database 216, a subsystem 218, and/or a number of engines, for example configuration engine 220, and/or update engine 222, and can be in communication with the database 216 via a communication link. The apparatus 214 can include additional or fewer engines than illustrated to perform the various functions described herein. The apparatus 214 can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. In some embodiments, the apparatus 214 can be analogous to the VCI manager 414 illustrated and described in connection with FIG. 4, herein.

The number of engines (e.g., 220, 222) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the configuration engine 220 can include a combination of hardware and program instructions that can be configured to cause a first VCI (e.g., VCI 106-1 illustrated in FIG. 1) that is running an application to be copied as a second VCI (e.g., VCI 106-2 illustrated in FIG. 1). The first VCI may be referred to herein as a "source VCI," while the second VCI may be referred to herein as a "target VCI." The application can be an application that is targeted for a near zero downtime update and/or upgrade. In some embodiments, copying the first VCI as a second VCI can include generating the second VCI such that the second VCI includes the same network information and/or storage layout as the first VCI. However, in some embodiments, the second VCI need not have a same amount of resources as the first VCI. For example, the second VCI can be generated having more or less memory resources, storage resources, and/or processing resources than the first VCI.

The configuration engine 220 can further include a combination of hardware and program instructions that can be configured to cause a private network (e.g., private network 436 illustrated in FIG. 4, herein) to be generated between the first VCI and the second VCI. For example, the configuration engine 220 can be configured to cause network to be generated between the first VCI and the second VCI such that the first VCI and the second VCI can securely pass communications between each other. As used herein, a "private network" is a network that uses private internet protocol address space. Private networks be used in local area networks, for example. In some embodiments, a private network can increase network security, as the private addresses are generally not accessible from a public network such as the internet. Further, as used herein, a "virtual private network" (VPN) is a private network that can be extended across a public network to allow data to be transferred across shared or public networks as if the data was being transferred across a private network. A VPN can facilitate data transfer through secure tunnels and/or can include the use of authentications (e.g., passwords, tokens, etc.) to allow access to the VPN. This can allow for increased data security in comparison to public networks such as the internet.

In some embodiments, generation and use of a private network or VPN to facilitate communication between the first VCI and the second VCI may allow for relaxed encryption to be used for communications between the first VCI and the second VCI in comparison to other network types that are not private. For example, in embodiments in which the private network generated between the first VCI and the second VCI is a VPN, security associated with the VPN can be provided through secure tunnels and/or utilizing encryption to ensure secure data transfer. This can ensure that the security of communications across the private network or VPN is high enough that other VCIs and/or nefarious users of distributed resources associated with the first VCI and the second VCI are unable to intercept and/or alter communications passed via the VPN, which can, in turn allow for relaxed encryption to be utilized on the communications passed between the first VCI and the second VCI as part of providing a near zero downtime application upgrade. This use of relaxed encryption between the first VCI and the second VCI may be desirable for providing the application upgrade. For example, through use of a private network, additional security measures that may be taken when using a public network can be reduced or forgone, because the security associated with the private network or VPN is adequate to ensure data integrity for communications between the first VCI and the second VCI.

The configuration engine 220 can further include a combination of hardware and program instructions that can be configured to cause data to be synchronized between the first VCI and the second VCI via the private network. Synchronization of data between the first VCI and the second VCI can include providing replication of data between the first VCI and the second VCI to copy the first VCI to the second VCI. In some embodiments, the data synchronization may be performed by the data synchronization tool(s) 438-1 and 438-2 illustrated in FIG. 4, herein.

The update engine 222 can further include a combination of hardware and program instructions that can be configured to cause an updated version of the application to be installed on the second VCI. For example, the update engine 222 can cause an updated version of the application to be installed on the second VCI while the previous version of the application is still running and servicing requests on the first VCI.

The update engine 222 can further include a combination of hardware and program instructions that can be configured to cause the application running on the first VCI to be deactivated and/or cause the update version of the application to be activated on the second VCI. For example, once the application is updated on the second VCI, the update engine can be configured to cause the application running on the first VCI to be deactivated. Deactivating the application on the first VCI can include ceasing service of the application. In some embodiments, after the application is deactivated on the first VCI, the updated application can be activated on the second VCI. Embodiments are not so limited, however, and the application can be deactivated on the first VCI concurrently with activating the application of the second VCI. During this process, the VCI that a user is using can be switched from the first VCI to the second VCI to provide a near zero downtime application update. For example, since the application is already updated on the second VCI, when the user is switched from the first VCI to the second VCI, the user may not be forced to incur application downtime resulting from an update to the application, thereby providing a near zero downtime application update from the user's perspective.

Figure 3:
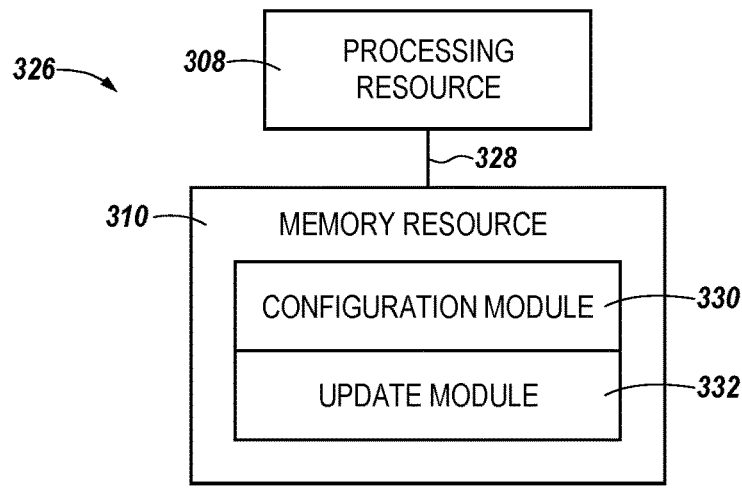
FIG. 3 is a diagram of a machine for near zero downtime application upgrades according to the present disclosure.

FIG. 3 is a diagram of a machine for packet generation and injection according to the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 326 (e.g., the machine 326 can include internal memory resources and have access to external memory resources). In some embodiments, the machine 326 can be a VCI, for example, the machine 326 can be a server. The program instructions (e.g., machine-readable instructions (MM)) can include instructions stored on the MRM to implement a particular function (e.g., an action such as packet generation and/or injection). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326. Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resources 310 are remote from the processing resources 308, such as in a network connection between the memory resources 310 and the processing resources 308. That is, the communication path 328 can be a network connection. Examples of such a network connection can include a local area network (LAN), wide area network (WAN), personal area network (PAN), and the Internet, among others.

As shown in FIG. 3, the MM stored in the memory resources 310 can be segmented into a number of modules 330 and 332, that when executed by the processing resource(s) 308, can perform a number of functions. As used herein a module includes a set of instructions included to perform a particular task or action. The number of modules 330, 332 can be sub-modules of other modules. For example, the update module 332 can be a sub-module of the configuration module 330 and/or can be contained within a single module. Furthermore, the number of modules 330, 332 can comprise individual modules separate and distinct from one another. Examples are not limited to the specific modules 330, 332 illustrated in FIG. 3.

Each of the number of modules 330, 332 can include program instructions and/or a combination of hardware and program instructions that, when executed by a processing resource 308, can function as a corresponding engine as described with respect to FIG. 2. For example, the configuration module 330 can include program instructions and/or a combination of hardware and program instructions that, when executed by a processing resource 308, can function as the configuration engine 220, the update module 332 can include program instructions and/or a combination of hardware and program instructions that, when executed by a processing resource 308, can function as the update engine 222.

FIG. 4 is diagram of a system 401 including a target virtual computing instance (VCI) 406-2 and a source VCI 406-1 for near zero downtime application upgrades according to the present disclosure. The system 401 may further include a VCI manager 414. The VCI manager 414 can be analogous to the VCI manager 114 shown in FIG. 1 or the apparatus 214 shown in FIG. 2. The VCI manager 414 can be in communication with the source VCI 406-1 and/or the target VCI 406-2, as indicated by the dashed lines coupling the VCI manager 414 to the source VCI 406-1 and the target VCI 406-2. As shown in FIG. 4, the source VCI 406-1 and the target VCI 406-2 can each include a respective data synchronization tool 438-1, 438-2. In some embodiments, an application 437 can be deployed and/or running on the source VCI 406-1. The application 437 can be updated through operation of the VCI manager 414 as described herein to deploy and/or run an updated application 439 on the target VCI 406-2.

The data synchronization tools 438-1, 438-2 can include logic and/or instructions that can be executable by processing resources available to the VCIs to which they are associated to provide data synchronization between the source VCI 406-1 and the target VCI 406-2. For example, the data synchronization tool 438-1 can include logic and/or instructions that can be executed by processing resources available to the VCI 406-1, and the data synchronization tool 438-2 can include logic and/or instructions that can be executed by processing resources available to the VCI 406-2 to provide data synchronization between the first VCI 406-1 and the second VCI 406-2. As described above in connection with FIG. 2, synchronization of data between the source VCI 406-1 and the target VCI 406-2 can include providing replication of data between the source VCI 406-1 and the target VCI 406-2 to copy the source VCI 406-1 to the target VCI 406-2. In some embodiments, the VCI manager 414 can cause the data synchronization tools 438-1 and 438-1 to be installed on the first VCI 406-1 and the second VCI 406-2, respectively.

Although not explicitly shown in FIG. 4, in some embodiments, the VCI manager 414 can be provisioned with a processing resource and/or a memory resource. The processing resource may serve to execute instructions stored by the memory resource to cause the VCI manager 414 to perform certain tasks and/or actions, as described in more detail below.

For example, the VCI manager 414 can be configured to cause a first VCI (e.g., the source VCI 406-1) that is running the application 437 to be copied as a second VCI (e.g., the target VCI 406-2). In some embodiments, copying the first VCI 406-1 as the second VCI 406-2 can include synchronizing transfer of data between the first VCI 406-1 and the second VCI 406-2 using the data synchronization tools 438-1 and 438-2.

In some embodiments, the VCI manager 414 can be configured to cause an updated version of the application 439 to be installed on the second VCI. Before, during, or after transfer of the data between the first VCI 406-1 and the second VCI 406-2, the VCI manager 414 can be configured to cause the updated version of the application 439 to be installed on the second VCI 406-2. In some embodiments, the updated version of the application 439 can include one or more different data formats than the application 437. In order to support the different data formats that may be associated with the updated version of the application 439, the VCI manager 414 can be configured to cause a transform operation (e.g., a data transform operation) to be performed on the application 437 and/or the updated version of the application 439. The transform operation can be performed when the application 437 is running on the first VCI 406-1 or on the updated version of the application 439 is running on the second VCI 406-2. In some embodiments, the transform operation can include translating between different formats, coding schemes, or languages that are used by the application 437 and the updated version of the application 439.

The VCI manager 414 can be configured to cause a private network 436 to be generated between the first VCI 406-1 and the second VCI 406-2. The private network 436 can be a VPN in some embodiments, as described above in connection with FIG. 2. The VCI manager 414 can further be configured to cause the application 437 running on the first VCI to be deactivated and cause the updated version of the application 439 to be activated on the second VCI. For example, the VCI manager 414 can be configured to cause the updated version of the application 439 to be activated on the second VCI 406-2 once the updated version of the application 439 has been installed on the second VCI 406-2. In some embodiments, the VCI manager 414 can be configured to cause the updated application 439 to be activated in response to completion of the data synchronization performed between the data synchronization tools 438-1 and 438-2.

The VCI manager 414 can be configured to cause network information and/or a storage layout to be copied from the first VCI 406-1 to the second VCI-2. In some embodiments, the VCI manager 414 can be configured to cause the network information and/or the storage layout to be copied from the first VCI 406-1 to the second VCI 406-2 via the private network 436. In addition to, or in the alternative, the VCI manager 414 can be configured to cause the network information and/or storage layout to be copied from the first VCI 406-1 to the second VCI 406-2 as part of the data synchronization performed between the data synchronization tools 438-1 and 438-2.

Although the VCI manager 414 can be configured to cause the network information and the storage layout to be copied form the first VCI 406-1 to the second VCI 406-2, the VCI manager 414 does not necessarily need to cause the second VCI 406-2 to have a same quantity of resources allocated thereto as the first VCI 406-1. For example, the VCI manager 414 can be configured to cause the second VCOI 406-2 to be provisioned with a different quantity of processing resources, memory resources, and/or storage resources than the first VCI 406-1. For example, the VCI manager 414 can be configured to cause the second VCI 406-2 to be provisioned with memory resources, processing resources, and storage resources irrespective of memory resources, processing resources, and storage resources with which the first VCI 406-1 is provisioned.

In some embodiments, the VCI manager 414 can be configured to cause the data synchronization operation to be aborted in response to a determination that data transfer between the first VCI and the second VCI is complete. For example, once the data transfer to copy the first VCI 406-1 to the second VCI 406-2 is complete, the VCI manager 414 can be configured to cause the data synchronization operation to be aborted. In some embodiments, the VCI manager 414 can be configured to cause the first VCI 406-1 to be deactivated after the data synchronization operation is aborted and/or cause the second VCI 406-2 to be activated substantially simultaneously with deactivation of the first VCI 406-1. As used herein, the term substantially simultaneously is intended to refer to a condition that is either simultaneous or sufficiently close to simultaneous so as to provide a near zero downtime application update. For example, activation of the second VCI 406-2 and deactivation of the first VCI 406-1 can occur within an order of milliseconds of each other, which can be deemed to be substantially simultaneously.

Subsequent to deactivation of the first VCI 406-1, the VCI manager 414 can be configured to cause the resources with which the first VCI 406-1 is provisioned to be released. For example, the VCI manager 414 can be configured to cause the first VCI 406-1 to be deleted or otherwise destroyed in response to deactivation of first VCI 406-1 and/or deactivation of the application 437 running on the first VCI 406-1. This may free up the resources that provisioned the first VCI 406-1 for other uses in a software defined data center environment.

Figure 5:
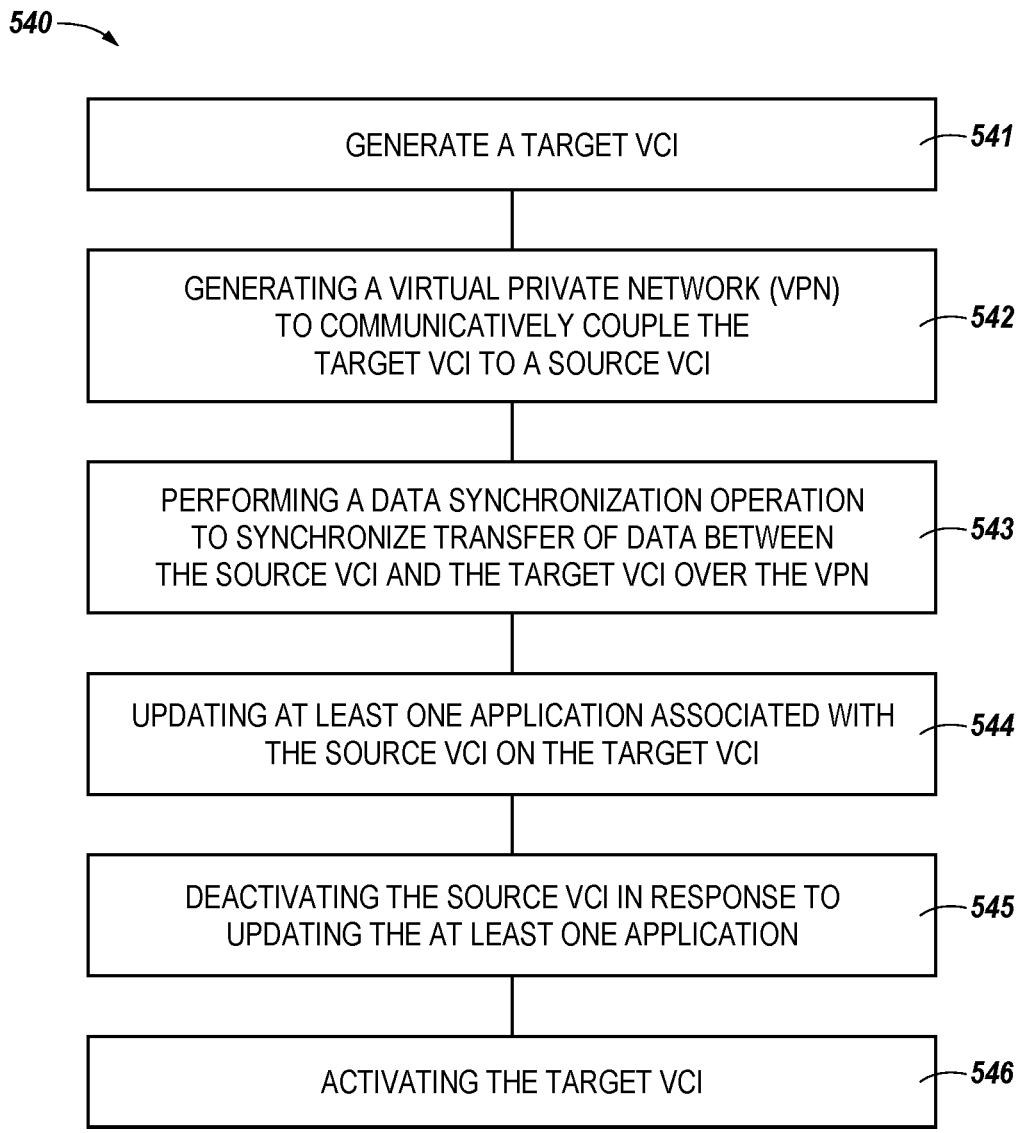
FIG. 5 is a flow diagram representing a method for near zero downtime application upgrades according to the present disclosure.

FIG. 5 is a flow diagram representing a method 540 for near zero downtime application upgrades according to the present disclosure. At block 541, the method 540 can include generating a target VCI. The target VCI can be analogous to target VCI 406-2 illustrated in FIG. 4, herein. The target VCI can be generated such that the target VCI has a different quantity of memory resources, processing resources, storage resources, or combinations thereof than the source VCI. In some embodiments, the target VCI can be used to upgrade an application running on a source VCI.

At block 542, the method 540 can include generating a private network, such as, but not limited to, a virtual private network (VPN) to communicatively couple the target VCI to a source VCI. The VPN can be analogous to VPN 436 illustrated in FIG. 4 and the source VCI can be analogous to the source VCI 406-1 illustrated in FIG. 4, herein. For example, the VPN can be used to provide enhanced security for communications between the source VCI and the target VCI, which can allow for communications between the source VCI and the target VCI to utilize relaxed security protocols, instead relying on the security provided by the VPN.

At block 543, the method 540 can include performing a data synchronization operation to synchronize transfer of data between the source VCI and the target VCI over the VPN. In some embodiments, the data synchronization operation can be performed using the data synchronization tools 438-1 and 438-2 illustrated in FIG. 4, herein. Synchronization of the data can include copying the data, storage layout, and/or network information from the source VCI to the target VCI.

At block 544, the method 540 can include updating at least one application associated with the source VCI on the target VCI. The application to be updated can be analogous to the application 437 illustrated in FIG. 4, herein. In some embodiments, the at least one application can be upgraded in a manner consistent with providing a near zero downtime upgrade as described above.

At block 545, the method 540 can include deactivating the source VCI in response to updating the at least one application. The updated application can be deployed on the target VCI and can be analogous to the updated application 439 illustrated in FIG. 4, herein. For example, once the application is upgraded on the target VCI, the source VCI can be deactivated and a user can be switched from the source VCI to the target VCI.

At block 546, the method 540 can include activating the target VCI. In some embodiments, the method 540 can further include deleting the source VCI in response to activating the target VCI. Embodiments are not so limited, however, and the target VCI can be deleted (or deactivated) in response to a determination that the data synchronization operation is complete, a determination that the at least one application update is complete, etc. By deleting the source VCI, resources of a software defined data canter can be freed up for use by other VCIs, etc.

In some embodiments, the method 540 can further include performing a data transform operation on data associated with the at least one application to update a data format of the at least one application. The data transform operation can be performed on the application while the application is deployed on the source VCI, the target VCI, or combinations thereof. For example, the data transform operation can be performed in a location in the system defined by the target VCI and the source VCI at a location that is most convenient, or a location that optimizes performance of the data transform operation.

In some embodiments, the method 540 can further include performing VCI operations using the source VCI concurrently with transferring data between the source VCI and the target VCI. For example, the application running on the source VCI can be used while data is being transferred from the source VCI to the target VCI. This can allow for a user to continue to use the source VCI and the application while the upgrade is taking place, which can improve the user's experience by reducing downtime associated with upgrading the application.

The method can further include performing computing functions using the source VCI concurrently with performing the data synchronization operation. For example, the source VCI can be configured to run the application that is being upgraded on the target VCI while the target VCI is being copied or generated, and/or while data is synchronized between the source VCI and the target VCI. This can allow for use of the application during the application upgrading operation, which can, in turn, allow for a near zero downtime application upgrade to be performed as described herein.

Figure 6:
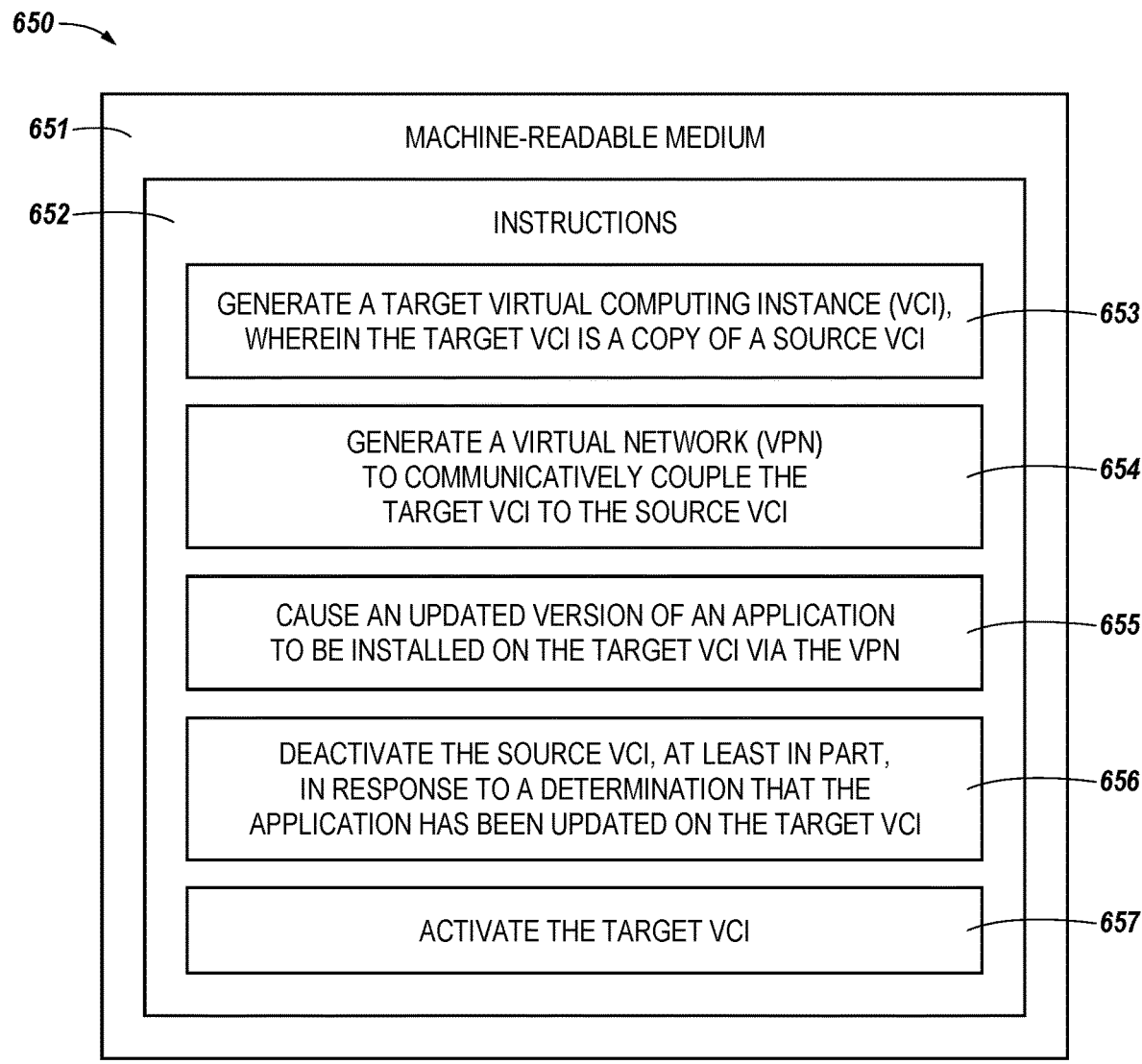
FIG. 6 is a non-transitory machine-readable medium storing instructions for near zero application downtime upgrades according to the present disclosure.

FIG. 6 is a non-transitory machine readable medium 651 storing instructions 652 for near zero application downtime upgrades according to the present disclosure. A processing resource (not explicitly shown) may execute instructions stored on the non-transitory machine readable medium 651. The non-transitory machine readable medium 651 may be any type of volatile or non-volatile memory or storage, such as random-access memory (RAM), flash memory, read-only memory (ROM), storage volumes, a hard disk, or a combination thereof.

At block 653, the medium 651 can store instructions executable by the processing resource to generate a target virtual computing instance (VCI), wherein the target VCI is a copy of a source VCI. As describe above, the target VCI can be generated such that it is provisioned with memory resources, processing resources, and/or storage resources. In some embodiments, the target VCI can be generated such that it has the same network information and storage layout as a source VCI that the target VCI is based on.

At block 654, the medium 651 can store instructions executable by the processing resource to generate a virtual private network (VPN) to communicatively couple the target VCI to the source VCI. The VPN can allow for secure communications between the target VCI and the source VCI.

At block 655, the medium 651 can store instructions executable by the processing resource to cause an updated version of an application to be installed on the target VCI via the VPN. The updated application can include improvements, alterations, updates, etc. to an application that is running on the source VCI.

At block 656, the medium 651 can store instructions executable by the processing resource to deactivate the source VCI, at least in part, in response to a determination that the application has been updated on the target VCI. For example, once the application has been upgraded on the target VCI, the source VCI can be deactivated. Embodiments are not limited to a determination that the application has been uploaded on the target VCI, however, and in some embodiments, the instructions can be executable by the processing resource to deactivate the source VCI based on a determination that data transfer between the source VCI and the target VCI has been synchronized. In some embodiments, once the source VCI has been deactivated, the source VCI can be deleted in order to free up the resources that the source VCI is provisioned with for other uses.

At block 657, the medium 651 can store instructions executable by the processing resource to activate the target VCI. In some embodiments, the target VCI can be activated concurrently (or substantially concurrently) with deactivation of the source VCI. This can allow for a near zero downtime upgrade to the application, as described herein.

In some embodiments, the medium 651 can further store instructions 652 executable by the processing resource to deploy a first data synchronization tool on the target VCI and deploy a second data synchronization tool on the second VCI. The first data synchronization tool can be analogous to the data synchronization tool 438-1 illustrated in FIG. 4, and the second data synchronization tool can be analogous to the data synchronization tool 438-2 illustrated in FIG. 4. The first data synchronization tool and/or the second data synchronization tool can synchronize replication of information associated with the source VCI to the target VCI. For example, the data synchronization tools can be configured to copy information associated with the source VCI to the target VCI. In addition to, or in the alternative, the instructions can be executable to cause abortion of the data synchronization operation once data synchronization between the target VCI and the source VCI has been achieved and/or deactivate the source VCI in response to abortion of the data synchronization operation.

The medium 651 can further store instructions 652 that are executable by the processing resource to cause a transform operation to be performed on the information that is transferred from the source VCI to the target VCI during the data synchronization operation. As described above, the transform operation can include supporting changes in data formats and the like between the application and the updated application. In some embodiments, the data transform operation can be performed by the target VCI subsequent to performance of the data synchronization operation or by the source VCI prior to (or during) the data synchronization operation.

In some embodiments, the application running on the source VCI that is being upgraded on the target VCI can be accessible and used by a user during performance of the data synchronization operation and/or during the update to the application on the target VCI. This can allow for a near zero downtime upgrade to the application since the user may still use the application on the source VCI while it is being updated on the target VCI.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A compute device for upgrading an application running on a virtual computing instance (VCI), comprising:
   a processing resource;
   a memory resource; and
   a VCI manager executed by the processing resource and the memory resource, wherein the VCI manager is configured to:
     cause a first VCI that is running the application to be copied as a second VCI;
     cause an updated version of the application to be installed on the second VCI, while the application is running and servicing a request on the first VCI;
     cause a virtual private network to be generated between the first VCI and the second VCI, while the application is running and servicing the request on the first VCI;
     cause data to be synchronized from the first VCI to the second VCI via the virtual private network, while the application is running and servicing the request on the first VCI;
     while the application is running and servicing the request on the first VCI, cause network information and storage layout to be synchronized from the first VCI to the second VCI via the virtual private network such that the second VCI is to include the network information and the storage layout same as the first VCI; and
     cause the application running on the first VCI to be deactivated and cause the updated version of the application to be activated on the second VCI in response to completion of the data, network information, and storage layout synchronization.

2. The compute device of claim 1, wherein the VCI manager is configured to cause a data synchronization tool to be installed on the first VCI and the second VCI to perform a data synchronization operation to synchronize the data from the first VCI to the second VCI.

3. The compute device of claim 2, wherein the data synchronization tool is configured to:
   cause the data synchronization operation to be aborted in response to a determination that data transfer from the first VCI to the second VCI is complete;
   cause the first VCI to be deactivated after the data synchronization operation is aborted; and
   cause the second VCI to be activated substantially simultaneously with the deactivation of the first VCI.

4. The compute device of claim 1, wherein the second VCI is provisioned with memory resources, processing resources, and storage resources irrespective of memory resources, processing resources, and storage resources with which the first VCI is provisioned.

5. The compute device of claim 4, wherein the VCI manager is configured to cause the memory resources, processing resources, and storage resources with which the first VCI is provisioned to be released in response to the deactivation of the application running on the first VCI.

6. A non-transitory machine-readable medium storing instructions executable by a processing resource to:
 generate a target virtual computing instance (VCI), wherein the target VCI is a copy of a source VCI that runs an application;
 generate a virtual private network (VPN) to communicatively couple the target VCI to the source VCI, while the application is running and servicing a request on the source VCI;
 perform a data synchronization operation to synchronize transfer of data from the source VCI to the target VCI over the VPN, while the application is running and servicing the request on the source VCI;
 while the application is running and servicing the request on the source VCI, cause network information and storage layout to be synchronized from the source VCI to the target VCI via the VPN such that the target VCI is to include the network information and the storage layout same as the source VCI;
 cause an updated version of the application to be installed on the target VCI, while the application is running and servicing the request on the source VCI;
 deactivate the source VCI, at least in part, in response to a determination that the application has been updated on the target VCI and completion of the data, network information, and storage layout synchronization; and
 activate the target VCI.

7. The medium of claim 6, wherein the instructions are further executable by the processing resource to deploy a first data synchronization tool on the source VCI and deploy a second data synchronization tool on the target VCI to synchronize replication of information associated with the source VCI to the target VCI.

8. The medium of claim 7, wherein the instructions are further executable by the processing resource to cause a transform operation to be performed on the information associated with the source VCI prior to transfer of data to the target VCI.

9. The medium of claim 6, wherein the instructions are further executable by the processing resource to:
 perform the data synchronization operation from the source VCI to the target VCI;
 cause abortion of the data synchronization operation responsive to a determination that the data synchronization from the source VCI to the target VCI has been achieved; and
 deactivate the source VCI, at least partially in response to the abortion of the data synchronization operation.

10. The medium of claim 6, wherein the instructions are further executable by the processing resource to deactivate the source VCI substantially concurrently with activating the target VCI.

11. The medium of claim 6, wherein the instructions are further executable by the processing resource to cause a transform operation to be performed on the transfer data, the transform operation performed by the target VCI, subsequent to transfer of data to the target VCI.

12. A method for upgrading a virtual computing instance (VCI), comprising:
 generating a target VCI;
 generating a virtual private network (VPN) to communicatively couple the target VCI to a source VCI, while at least one application is running and servicing a request on the source VCI;
 performing a data synchronization operation to synchronize transfer of data from the source VCI to the target VCI over the VPN, while the at least one application is running and servicing the request on the source VCI;
 while the at least one application is running and servicing the request on the source VCI, synchronizing network information and storage layout from the source VCI to the target VCI via the VPN such that the target VCI is to include the network information and the storage layout same as the source VCI;
 updating the at least one application associated with the source VCI on the target VCI while the at least one application is running and servicing the request on the source VCI;
 deactivating the source VCI in response to updating the at least one application and completion of the data synchronization; and
 activating the target VCI.

13. The method of claim 12, further comprising performing a data transform operation on data associated with the at least one application to update a data format of the at least one application.

14. The method of claim 12, further comprising performing VCI operations using the source VCI concurrently with transferring data from the source VCI to the target VCI.

15. The method of claim 12, further comprising generating the target VCI such that target VCI has a different quantity of memory resources, processing resources, storage resources, or combinations thereof, than the source VCI.

16. The method of claim 12, further comprising deleting the source VCI in response to activating the target VCI.

17. The method of claim 12, further comprising performing computing functions using the source VCI concurrently with performing the data synchronization operation.

* * * * *